United States Patent [19]
Edwards et al.

[11] 3,850,217
[45] Nov. 26, 1974

[54] PNEUMATIC TIRES
[75] Inventors: Reginald Harold Edwards; Geoffrey Lionel Coulter, both of Sutton Coldfield; Alan Michael Dodd, Walsall, all of England
[73] Assignee: Dunlop Limited, London, England
[22] Filed: Apr. 24, 1973
[21] Appl. No.: 353,937

[30] Foreign Application Priority Data
 Mar. 5, 1972  Great Britain................... 20501/72

[52] U.S. Cl............. 152/330 RF, 152/158, 152/347
[51] Int. Cl. ..................... B60c 17/00, B60c 19/12
[58] Field of Search........ 152/158, 330 R, 352, 353, 152/354, 379, 346, 347, 348

[56] References Cited
UNITED STATES PATENTS
3,142,326  7/1964  Lindley.............................. 152/158
3,143,155  8/1964  Knox................................. 152/330
3,254,692  6/1966  Travers.............................. 152/340
3,610,308  10/1971  McDonald...................... 152/330 A
3,739,829  6/1973  Powell et al. ................... 152/330 R Primary Examiner—Drayton E. Hoffman
Attorney, Agent, or Firm—Stevens, Davis, Miller & Mosher

[57]  ABSTRACT

A tire and wheel assembly in which one or more ingredients of a lubricant composition are enclosed separately from other ingredients, all the ingredients being enclosed in enclosing means which, on deflation of the tire, will release them into the inflation chamber of the assembly to form the composition.

16 Claims, 3 Drawing Figures

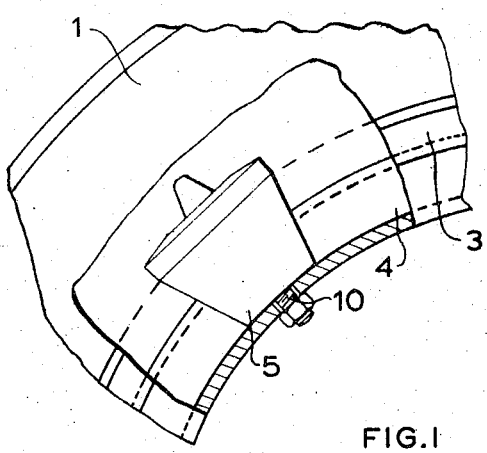
FIG.1
FIG.2
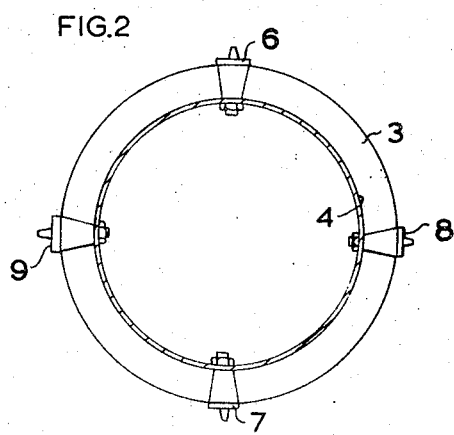
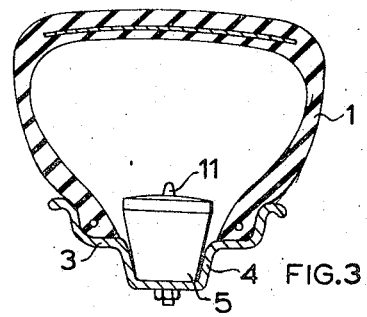
FIG.3

PNEUMATIC TIRES

This invention relates to tires and also to assemblies of such tires with wheels.

In the assignee's co-pending U.S. Pat. Application Ser. No. 150,627 filed June 7, 1971 there is described a pneumatic tire and wheel assembly comprising an enclosing means for a lubricating material for the interior surface of the tire said lubricating material being releasable from the enclosing means into the inflation chamber defined by the tire and wheel upon substantial loss of inflation pressure or deflation of the tire.

The lubricating material may comprise a composition which contains several ingredients for various purposes and it is better for storage purposes if all the ingredients are not brought together until they are to be used.

According to the present invention a method for the manufacture of a pneumatic tire and wheel assembly includes the step of incorporating into said tire and wheel assembly enclosing means enclosing separately from one another at least two ingredients of a lubricant composition for lubricating the interior surface of the tire, said enclosing means being adapted to release said ingredients into the inflation chamber defined by the tire and wheel upon substantial loss of inflation pressure or deflation of the tire to form said composition.

According to the invention also a pneumatic tire and wheel assembly comprises enclosing means enclosing separately from one another at least two ingredients of a lubricant composition for lubricating the interior surface of the tire said enclosing means being adapted to release said ingredients into the inflation chamber defined by the tire and wheel upon substantial loss of inflation pressure or deflation of the tire to form said composition.

According to the invention also there is provided a pneumatic tire having attached to its interior surface an enclosing means separately enclosing at least two ingredients as described above.

According to the invention also there is provided a wheel for a pneumatic tire said wheel carrying an enclosing means separately enclosing at least two ingredients as described above.

One ingredient of the lubricant composition may suitably comprise a liquid lubricant, e.g., as described in the assignee's U.S. Pat. No. 3,739,829.

The lubricant is used to lubricate the interior surfaces of the tire but may also be utilized to perform two other functions, namely to seal a puncture in the tire and to at least partially reinflate the tire. Where the lubricant composition consists of more than two ingredients the composition formulation may be divided into two or more parts each of one or more ingredients and the parts separately enclosed.

A liquid lubricant may be selected from a wide range of classes of compounds including lubricants for rubber to rubber interfaces, for example:

| | |
|---|---|
| Water | |
| Animal oils | |
| Vegetable oils | e.g. castor, linseed oils. |
| Alcohols: | |
|   Monohydric | e.g. n-octanol. |
|   Dihydric (diols, glycols) | e.g. ethylene glycol. |
|   Trihydric (triols) | e.g. glycerol. |
|   Polyhydric (polyols) | |
| Esters | e.g. methyl caprylate. |
| Silanes | |
| Non-ionic surface active agents | |
| Cationic surface active agents | |
| Anionic surface active agents | |
| Poly(oxyalkylene)glycols Generalized formula | e.g. poly(oxyethylene)glycols and poly(oxypropylene)glycols of various molecular weights, and blends of these. |

$$RO-\left[CH_2-CH-O\right]_x-R''$$
$$\phantom{RO-\bigg[CH_2-}R'\phantom{-O\bigg]_x-R''}$$

or

| | |
|---|---|
| Poly(oxyalkylene)glycols containing copolymers or two or more different oxyalkylene components of generalized formula | e.g. blends of copolymers of various molecular weights containing ethylene oxide and propyleneoxide units, for instance Ucon 50-HB-2000. |

$$RO-\left[CH_2-CH-O\right]_m-\left[CH_2-CH-O\right]_n \cdots R'''$$
$$\phantom{RO-\bigg[CH_2-}R'\phantom{-O\bigg]_m-\bigg[CH_2-}R''\phantom{-O\bigg]_n}$$

In these generalized formulae R, R', R" and R''' represent alkyl groups or H and $m$, $n$ and $x$ are integers.

| | |
|---|---|
| Glycol ethers | e.g. hexyl cellosolve ($C_6H_{13}OCH_2CH_2OH$), butyl carbitol ($C_4H_9O(CH_2CH_2O)_2H$), methoxy triglycol ($CH_3O(CH_2CH_2O)_3H$). |
| Dibasic acid esters | |
| Chlorofluorocarbon polymers | |
| Silicones | (organo-silicon oxide polymers). |
| Silicate esters | |
| Fluoroesters | |
| Neopentyl polyol esters | |
| Polyphenyl ethers | |
| Tetra alkyl silanes | |
| Ferrocene derivatives | |
| Tetra-substituted urea derivatives | |
| Heterocylic derivatives | |
| Soaps | e.g. sodium stearate. |
| Alakalis | e.g. sodium carbonate in aqueous solutions. |

Blends of two or more such materials may be used.

It is useful if the lubricant composition will help to seal a puncture in the tire simply to prevent loss of lubricant but when the composition contains a volatile component it is most desirable that it should also be capable of sealing the puncture. Thus the lubricant composition may have incorporated therein a separate puncture-sealing or reducing material, for example, chopped cotton wool, asbestos or synthetic fibers, e.g., of 0.0001 inch diameter and about 0.1 inch long which acts to form a better barrier over a puncture and is carried into position by escaping inflationary air and/or lubricant. Such materials preferably have a range of lengths and diameters. They can seal better if used in conjunction with other solid materials such as graphite, mica, crumb rubber, polyethylene flakes, etc.

A convenient method of obtaining a lubricant composition which will at least partially reinflate the tire after it has sealed the puncture(s) is to use a lubricant composition containing a volatile component. Thus the lubricant composition may, with advantage contain a volatile liquid, which may or may not in itself act as a lubricant for the rubber but which has a boiling point sufficiently low to appreciably volatilise at the temperature generated by running of the tire in a deflated or partly deflated condition. In this way the volatile liquid functions to partially reinflate the tire and so reduce the high stresses generated in the sidewall and tire/wheel assembly generally, due to the deflated or substantially deflated condition. Alternatively the lubricant composition may include two ingredients which react when brought together producing a gas to at least partially reinflate the tire. When partial reinflation is achieved, heat build-up in the tire is lowered due to the reduced sidewall deflection and the reduced contact pressure and hence reduced frictional forces between the interior tire surfaces, but when the reinflation is achieved by means of a volatile liquid the volatilizing of the volatile liquid also assists the dissipation of heat over the entire tire and rim surface. The volatile liquid may, having a boiling point (or, if two or more volatile components are used, an initial boiling point) up to for example, 150°C. but preferably not below, for example 60°C in order that the liquid may be readily handled and not volatilised appreciably during normal running of the tire.

The volatile liquid may itself be used to form the basis of the lubricant, e.g., an aqueous gel, although it is then particularly preferable to include in the lubricant composition some puncture sealing material in order to at least partly seal a puncture occurring in the tire to minimise the rate at which lubricant and vapor is lost from the tire.

Preferably the lubricant composition containing a volatile liquid comprises also a high boiling point component, e.g., glycerol, to ensure continued lubrication in the event of loss of the volatile component by evaporation.

A preferred volatile liquid is water, which has lubricating properties on rubber to rubber contacting surfaces. Preferably the water contains a further volatile liquid such as an alcohol, e.g., ethylalcohol, to enhance the volatility (lower the initial boiling point) and also reduce the freezing point of the water (if this has not been adequately reduced by the high boiling component). Various components already mentioned such as cellulose derivatives e.g., carboxy methyl cellulose; hydroxy-ethyl cellulose; surface active agents — cationic, anionic and non-ionic; and soaps can be used to enhance the lubricity of the water.

In the case of liquid lubricants containing water as the volatile liquid, viscosities at low shear, at 20°C in the range 10,000 to 200,000 centistokes and good lubricant properties can be achieved by the use of gelling agents such as those available under the trade names Natrosol (ex. Hercules Powder Co.) and Carbopol (ex. Goodrich Chemical Co.). The viscosity of these gels decreases with increasing shear. Viscous liquid lubricants such as gelled water-based lubricants have the added advantage that they assist in sealing small punctures at least against the usually low, e.g., 4 p.s.i. pressures produced by vapour pressure inflation.

Examples of liquid lubricants containing water as the volatile component are solutions of detergents, e.g., "Teepol" (ex. Shell Chemicals) in water, aqueous gels containing e.g., hydroxyethyl cellulose, with or without a high boiling point component such as glycerol, and mixtures of polyglycols, poly(oxyalkylene) glycols or glycerol with water.

The liquid components of the lubricant composition are preferably miscible with water so that leakage from a tire and wheel assembly onto a road surface can be washed away, e.g., by rain-water although a water insoluble component can be used if desired. It is also desirable that the lubricant composition should not freeze at temperatures above $-20°C$. so as to withstand cold weather and for extreme climates at temperatures above $-50°C$. The liquid components of the lubricant composition may have a boiling point of at least 90°C and preferably, in order to withstand high temperatures without severe loss through volatilization, at least one liquid component of the lubricant has a boiling point above 150°C.

As well as being formulated to have a suitable viscosity for rubber to rubber friction at the working temperature two other factors are preferably taken into account.

The lubricant composition advantageously has a viscosity which is as high as it is practicable to minimise lubricant loss through a puncture and perhaps even assist in sealing a puncture. At the same time the lubricant should have a viscosity as low as practicable to enable it to flow readily into the portions of the tire interior requiring lubrication. The preferred viscosity range for the liquid lubricant in operation is 4 to 12,500 centistokes at the temperatures generated in the nip between contacting surfaces when the tire is run without inflation pressure. This temperature is estimated to be in the range 50° to 130°C. In some formulations however under pre-puncture or low shear conditions the lubricant composition may be a gel having a much higher viscosity but whose viscosity may be reduced by shear or by the addition of an ingredient which dilates the gel.

The lubricant composition preferably has no deleterious effect on the tire although if desired, compositions which normally swell or otherwise affect rubber could be used by the use of a special resistant inner liner in the tire. In the latter case an ingredient which swelled rubber could assist in sealing a puncture in the tire since the puncture hole would permit the swelling agent to pass through the liner and swell the rubber in the walls of the puncture.

Further additives may also be used, for example, a lubricant composition based on an aqueous gel may contain, for example, a freeze point lowering agent such as ethylene glycol or glycerol and agents to increase the lubricating power such as molybdenum disulphide, dispersable graphite powder and/or wetting agent or detergent such as "Teepol."

If, for example, a detergent is used in a lubricant containing water a defoaming agent may also be used in the lubricant composition to control the extent of foaming, or if desired prevent foaming.

A dispersant may be used when fibers or other insoluble solids are incorporated in the composition.

In addition to the puncture sealing and other additives previously mentioned the lubricant composition may contain other substances such as antioxidants, to reduce the rate of oxidative attack on the lubricant, bactericide, wetting agent and viscosity index improver to broaden the range of temperatures at which the composition has a satisfactory viscosity, and corrosion inhibitor to protect the wheel rim, which will generally be of metal, from corrosion.

In order to minimize the weight of lubricant composition required and any detrimental effects on the balance of the wheel tire assembly the composition preferably has a relatively low specific gravity, e.g., a specific gravity less than 1.4.

The ingredients of the lubricant composition which are separately enclosed may for example be (a) water, containing various of the additives mentioned above dissolved or dispersed therein such as fine asbestos fibres, defoaming agents, etc. and (b) a gelling agent such as hydroxyethyl cellulose, hydroxypropyl cellulose, sodium carboethyl cellculose, carboxymethyl hydroxethyl cellculose and carboxyvinyl polymers. The latter ingredients are solids which are enclosed in the enclosing means in finely divided form so that they are rapidly dispersed when released. When using a lubricant composition of this type if the composition is enclosed ready mixed the viscosity of the composition may reduce with storage. Further, the viscosity may be too high for easy flowability and may thus delay its exit from the enclosing means when released. In the present invention these difficulties can be avoided.

Alternatively in a case where a lubricant composition is required to produce a vapour or gas to at least partially inflate the tire two ingredients separately enclosed may contain two substances which chemically react to produce a gas, e.g., phosphoric acid and sodium carbonate. In this case the sodium carbonate and the acid may both be enclosed separately from or, in admixture with other components of a lubricant composition, e.g., water, ehtylene glycol. The gas generated in this case by release of these reagents would be carbon dioxide.

A number of suitable enclosing means for use in this invention are described in U.S. Pat. Application Ser. No. 150,627 e.g., rupturable encapsulated particles of lubricant in a suitable encapsulating resin applied as a coating to the tire interior, lubricant containers mounted to the wheel rim or built into the wheel rim, all of which may be used to separately enclose two or more different ingredients to keep them apart until required to be brought together.

It will be appreciated that the enclosing means may be inside the inflation chamber of the wheel and tire assembly or may be on the wheel and separate therefrom connected to the inflation chamber by a suitable passage.

Further suitable enclosing means intended as containers for lubricant material can also be used as bead retaining means on a well-based rim.

When the wheel rim being used in a split rim a particularly suitable arrangement consists of a plurality of containers mounted on a supporting band, e.g., a metal band, which may simply be slid onto the rim when the two parts of the rim are separated.

The pneumatic tire is preferably a radial ply pneumatic tire of relatively low aspect ratio, e.g., 50 per cent to 75 per cent and to ensure that at least in a straight-ahead position, the load from the rim flanges is carried by the tread of the tire, the tire preferably has a tread wider than the distance between the rim flanges when mounted on the rim in the tire/wheel assembly.

Preferably the tire is of the type in which the stiffness of the tread and sidewall structure together with the width of the tread is such that when in use with the tire deflated or substantially deflated and subject to a substantial lateral force one of the said sidewalls will be placed under tension in the region of the contact patch to restrain the tread from lateral movement while the other sidewall will be disposed in a folded state in the said region so as to be capable of acting as a buffer between a flange on a wheel rim on which the tire is mounted and a road surface.

It will be appreciated that the present invention is concerned with a tire and wheel assembly which is to be capable of being used with the tire in a deflated or substantially under-inflated condition. This is not possible with a conventional tire/well-base-rim assembly since when the tire becomes deflated the tire beads can move from their seats and because of the well in the rim lose contact with the rim so that controlled movement of the tire by the rim is lost.

In the use of the present invention steps therefore must be taken to ensure that the tire is not dislodged in this way. Thus either a rim without a well should be used, e.g., a split rim or a rim in which the well has been closed up by axial compression after the tire mounting has been faciliated or restraining means should be provided to prevent either bead falling into a well. Many such restraining mean have been previously proposed, e.g., a bead spacer, spacer units, movable studs, or projects on the wheel rim. A preferred means of restraining the laterally outer tire bead on a split or axially compressed rim is to provide the tire bead with an extended toe portion in the form of an annulus which is inwardly directed and rests in the notch in the rim as described in the assignee's U.S. Pat. Application Ser. No. 276,449, filed July 31, 1972. The annulus is compressed into the notch upon the tilting of the bead under the influence of lateral forces and the bead is thus restrained from axial movement.

This invention will now be described in more detail in the following example in which reference is made to the accompanying drawings of which FIG. 1 is a side view of a portion of a tire and wheel assembly from which a part of the tire and of the wheel rim has been cut away to reveal the interior.

FIG. 2 is a sectional side view of the wheel rim of FIG. 1 with containers attached.

FIG. 3 is a cross sectional view of a tyre and wheel assembly showing a container in position in the rim well.

EXAMPLE

As illustrated in FIGS. 1, 2, and 3 the pneumatic tire and wheel assembly consists of a radial ply tire 1 and wheel having a well base rim 3 which is appreciably narrower between its flanges than the width of the tread of the tire. Within the well 4 of the rim are located four containers 5 of which two, 6 and 7 contain one reagent component A of a lubricant composition and the other two 8 and 9 contain the complementary part of B of the composition.

The containers 5 are of the type having a rigid shell of plastics material and are secured in position in a hole in the wheel rim by means of a screwed hollow metal spigot 10 positioned centrally in the base of the container shell. The radially outer portion of the shell is arranged to project beyond the well of the rim and is provided with a valve plunger 11 projecting beyond the shell. This plunger operates a valve within the shell which is arranged to release reagent from the shell only when the plunger is depressed.

This arrangement has the advantage that all the reagents cannot be released from the shell by a single impact on the tire.

An experiment was carried out to demonstrate the generation of pressure inside a deflated tire. Two components A and B of a lubricant composition are given below in Table I.

TABLE I

| Component A (Aqueous NcHCO₃ solution) | |
|---|---|
| Sodium bicarbonate NaHCO₃ solid | 42g |
| Dissolved in water, volume of water | 600 ml |
| Component B | |
| Ucon 50 —HB-5100 × (blend of poly(oxyalkylene) glycols of various molecular weights and having a viscosity at 100°F of 5100 Saybolt seconds or approximately 1000 (centipoises)) | 300 ml |
| 39% ortho-phosphoric acid | 30 ml |

Component A was placed inside a 165/69 HR-12 cover fitted to a crimped wheel rim — i.e., a rim in which the well has been closed by axial compression. The valve was removed and the whole assembly was placed horizontally in an oven and left to reach 70°C. No internal pressure could be generated because the valve core was not in place. (A separate identical experiment with the valve core in place revealed a pressure rise in the tire to 6 pounds/square inch caused by water vapour pressure increase and expansion of the internal air).

Component B was heated separately to 70°C. then injected into the tire down the valve hole and the valve core quickly replaced. The tire, still in the oven at 70°C to simulate hot run-flat conditions, was generally agitated to mix the components A and B. A tire pressure of 8.2 pounds per square inch was achieved due to the in-situ generation of Carbon Dioxide.

Having now described our invention, what we claim is:

1. A pneumatic tire and wheel assembly capable of being run in a deflated condition comprising:
   a. a pneumatic tire having an interior surface and mounted upon a wheel rim to define therewith an inflation chamber;
   b. means for lubricating the interior surface of the tire when operated in a deflated condition comprising at least two ingredients of a lubricant composition, at least one of said ingredients being a lubricating material;
   c. enclosing means within said inflation chamber for enclosing separately from one another said at least two ingredients;
   d. said enclosing means being adapted to release said at least two ingredients into the inflation chamber upon deflation or substantial loss of inflation pressure to permit said at least two ingredients to mix to form said lubricant composition.

2. A pneumatic tire and wheel assembly according to claim 1 in which one ingredient includes a puncture sealing material.

3. A pneumatic tire and wheel assembly according to claim 2 in which the puncture sealing material is selected from chopped cotton wool, asbestos and synthetic fibers.

4. A pneumatic tire and wheel assembly according to claim 3 in which said fibers are used in conjunction with another solid material selected from graphite, mica, crumb rubber and polyethylene flakes.

5. A pneumatic tire and wheel assembly according to claim 1 in which one ingredient comprises a volatile liquid which has a boiling point sufficiently low to appreciably volatilize at the temperature generated by running of the tire in a deflated or partially deflated condition.

6. A pneumatic tire and wheel assembly according to claim 5 in which the volatile liquid has an initial boiling point between 60°C. and 150°C.

7. A pneumatic tire and wheel assembly according to claim 5 in which the volatile liquid is water.

8. A pneumatic tire and wheel assembly according to claim 7 in which the water contains a further volatile liquid to enhance the volatility and also reduce the freeze point of the water.

9. A pneumatic tire and wheel assembly according to claim 8 in which the further volatile liquid is ethyl alcohol.

10. A pneumatic tire and wheel assembly according to claim 1 in which the lubricant composition is an aqueous gel and the ingredients of the lubricant composition which are separately enclosed are
    a. water, optionally having various additives dissolved or dispersed therein, and
    b. a solid gelling agent for the water.

11. A pneumatic tire and wheel assembly according to claim 1 in which the lubricant composition includes two ingredients which react when brought together to produce a gas to at least partially reinflate the tire.

12. A pneumatic tire and wheel assembly according to claim 1 in which the wheel rim is a split rim and the enclosing means comprises a supporting band for the compartments extending around the rim.

13. A pneumatic tire and wheel assembly according to claim 1 in which the pneumatic tire is a radial ply pneumatic tire having an aspect ratio in the range 50 percent to 75 percent.

14. A pneumatic tire and wheel assembly according to claim 1 in which the pneumatic tire has a tread which is wider than the width between flanges when the tire is inflated to its normal working pressure.

15. A pneumatic tire and wheel rim assembly capable of being driven in a deflated condition comprising:
    a. a pneumatic tire having an interior surface and mounted upon a wheel rim, to define an inflation chamber therewith;
    b. an enclosing means comprising at least two separate compartments containing different ingredients of a lubricant composition for lubricating the interior surfaces of the tire, each compartment being adapted to release the ingredient contained therein into the inflation chamber to form said lubricant composition through mixture of said ingredients upon substantial loss of inflation pressure or deflation of the tire and wheel rim assembly.

16. A pneumatic tire capable of being driven deflated comprising:

a. an interior surface in the tire;
b. means for lubricating the interior surface when the tire is driven deflated comprising at least two ingredients of a lubricant composition, at least one of said ingredients being a lubricating material,
c. enclosing means attached to said interior surface for enclosing separately from one another said at least two ingredients;
d. said enclosing means being adapted to release said at least two ingredients onto the interior surface upon deflation of the tire to permit said at least two ingredients to mix to form said lubricant composition.

* * * * *